Figure 8:
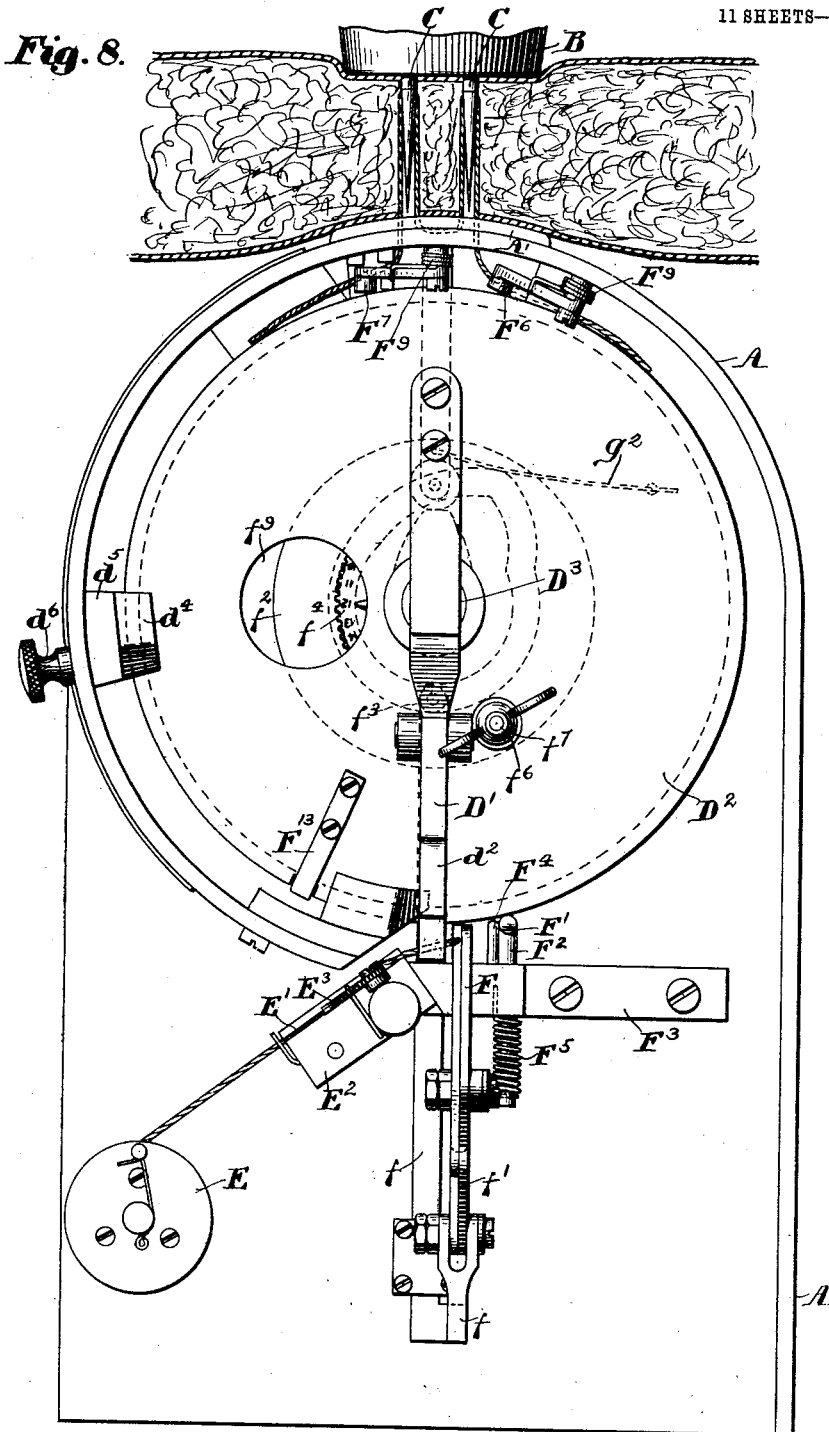

No. 784,749. PATENTED MAR. 14, 1905.
S. A. MILLER & C. B. GILMORE.
LOOPING AND TYING MACHINE.
APPLICATION FILED OCT. 6, 1902.
11 SHEETS—SHEET 1.
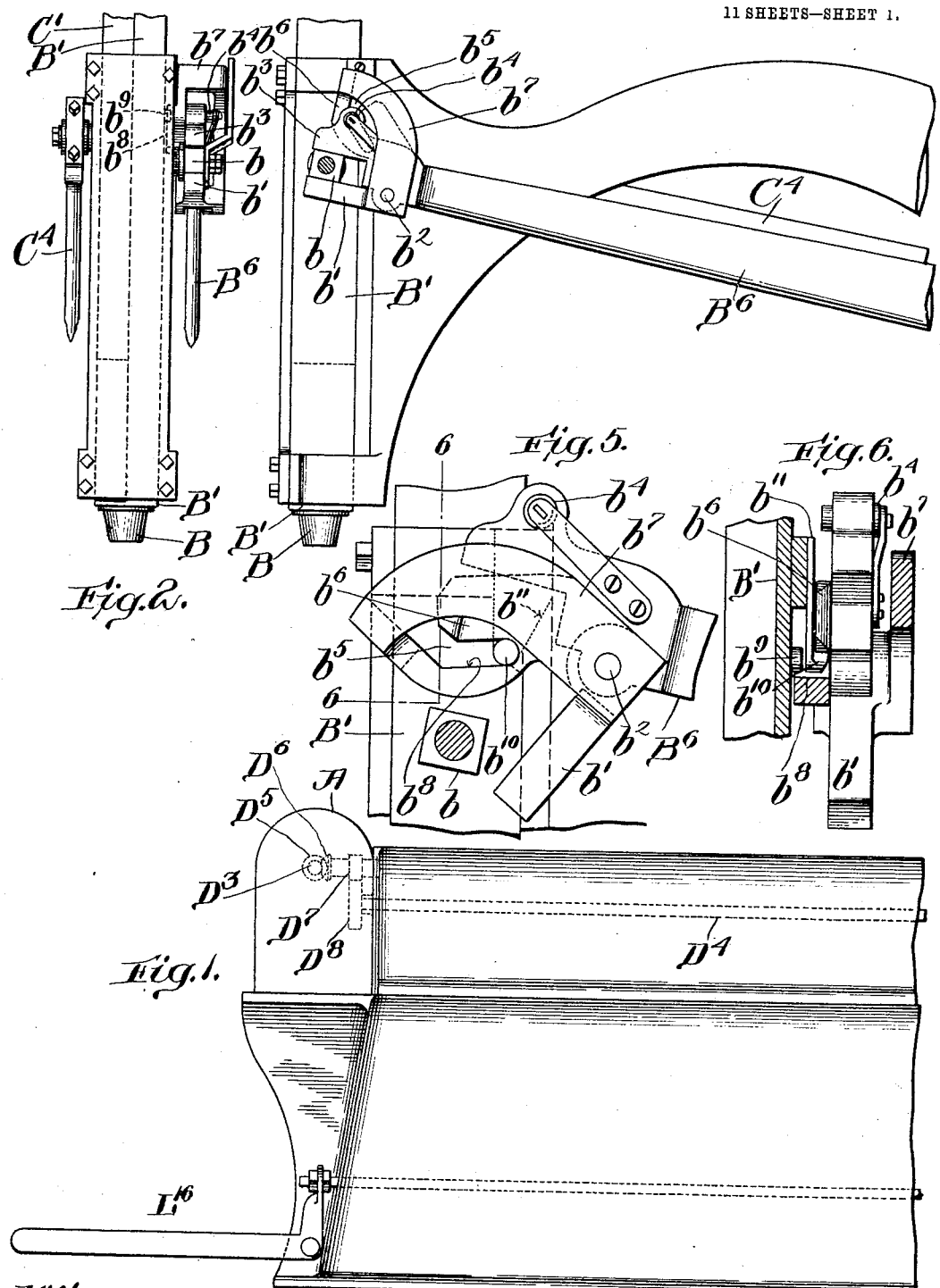

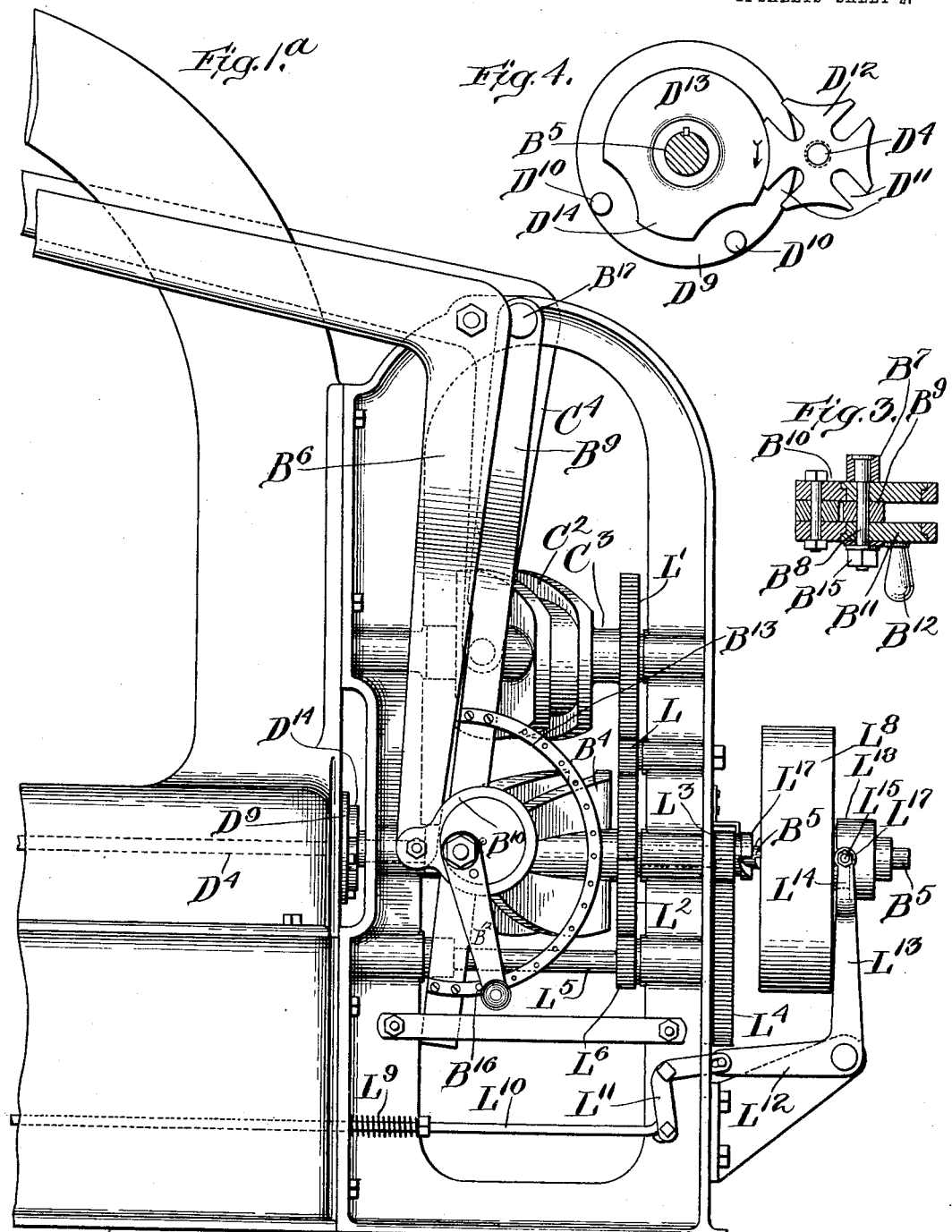

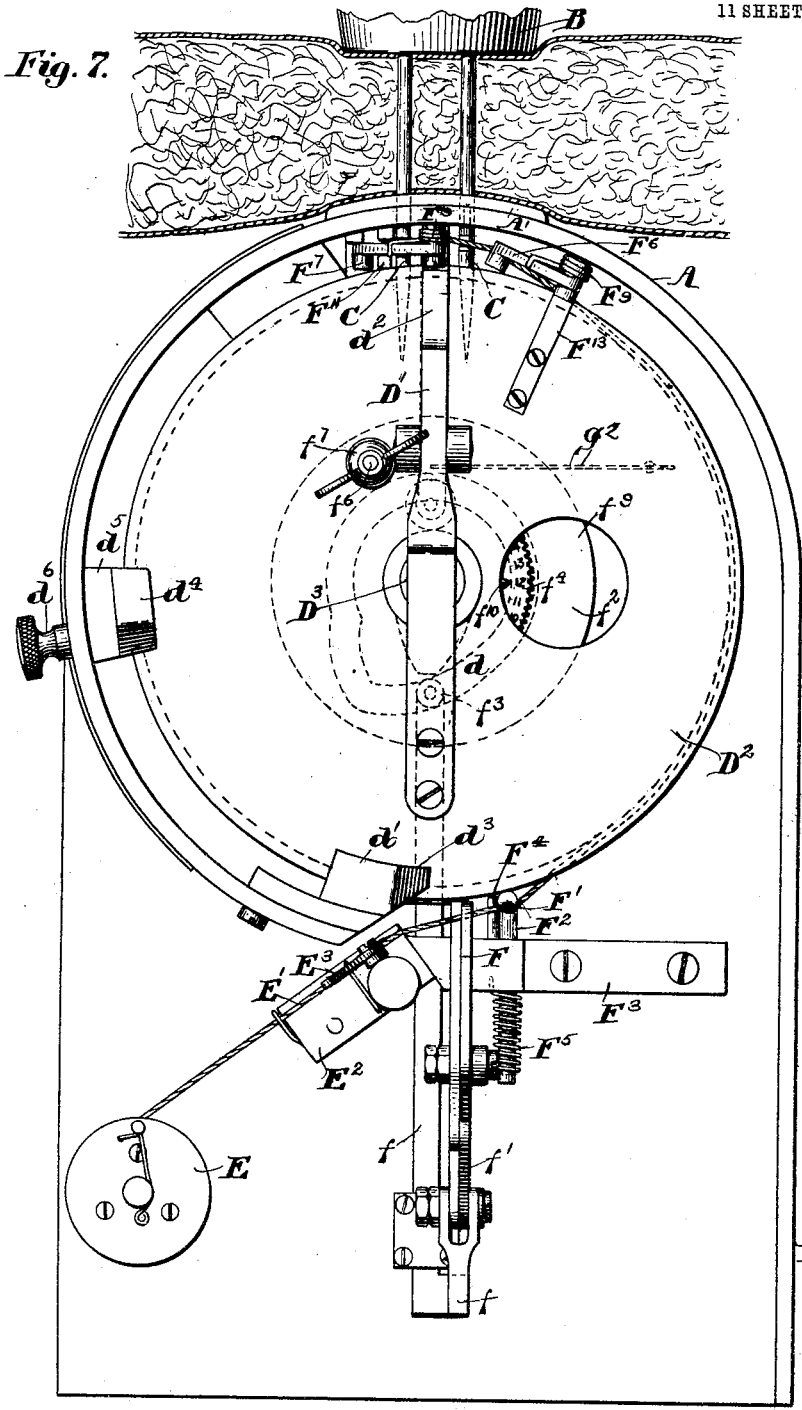

No. 784,749. PATENTED MAR. 14, 1905.
S. A. MILLER & C. B. GILMORE.
LOOPING AND TYING MACHINE.
APPLICATION FILED OCT. 6, 1902.

11 SHEETS—SHEET 4.

Witnesses:
Walter E Lombard
Geo. N. Goddard

Inventors
Silas A. Miller
Charles B. Gilmore

No. 784,749. PATENTED MAR. 14, 1905.
S. A. MILLER & C. B. GILMORE.
LOOPING AND TYING MACHINE.
APPLICATION FILED OCT. 6, 1902.

11 SHEETS—SHEET 5.

Witnesses:
Walter E. Lombard.
Geo. N. Goddard.

Inventors
Silas A. Miller
Charles B. Gilmore
by Ira L. Fish Atty.

No. 784,749. PATENTED MAR. 14, 1905.
S. A. MILLER & C. B. GILMORE.
LOOPING AND TYING MACHINE.
APPLICATION FILED OCT. 6, 1902.

11 SHEETS—SHEET 6.

Witnesses:
Walter E. Lombard
Geo. N. Goddard

Inventors
Silas A. Miller
Charles B. Gilmore
by Ora L. Fish atty.

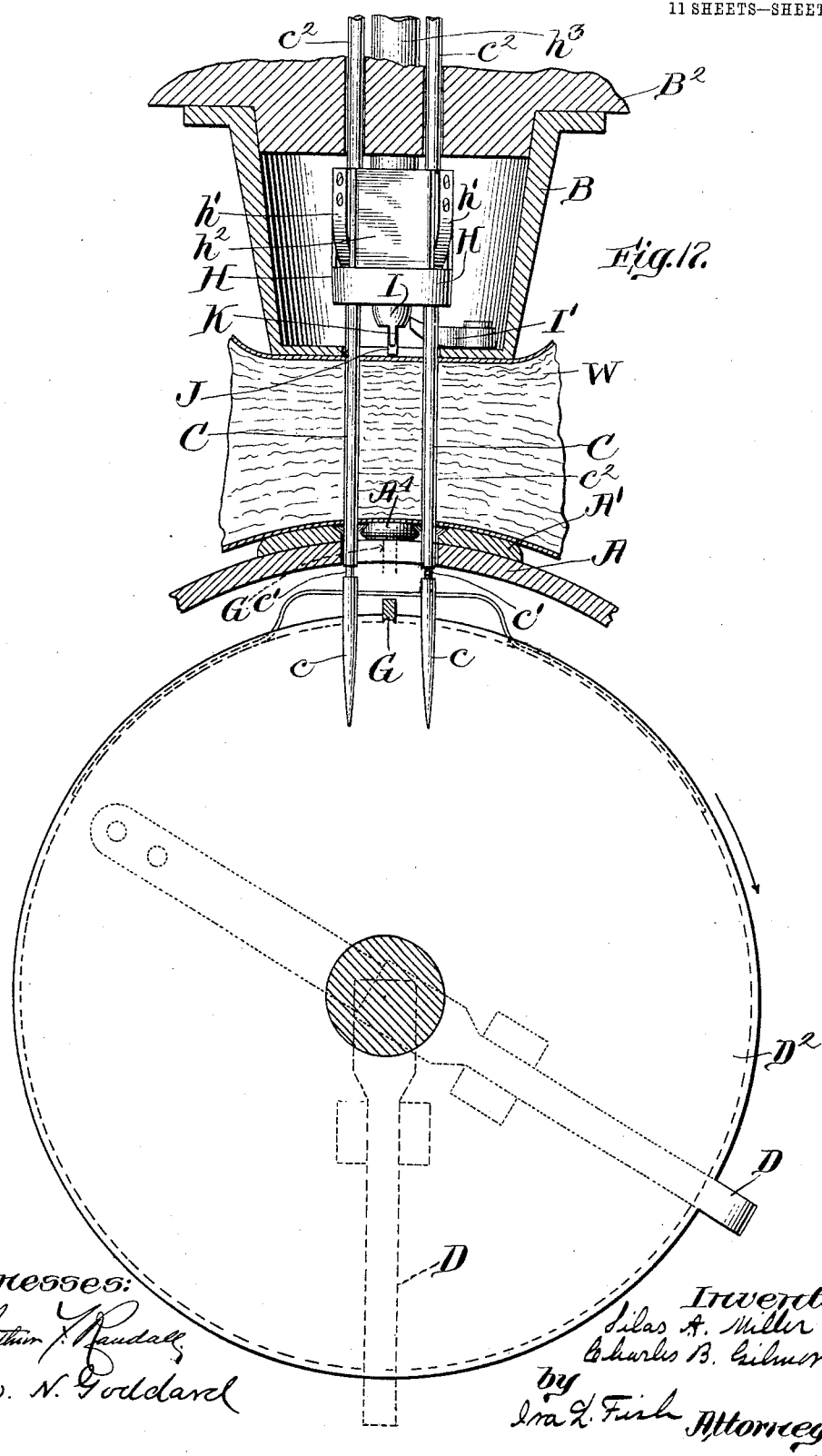

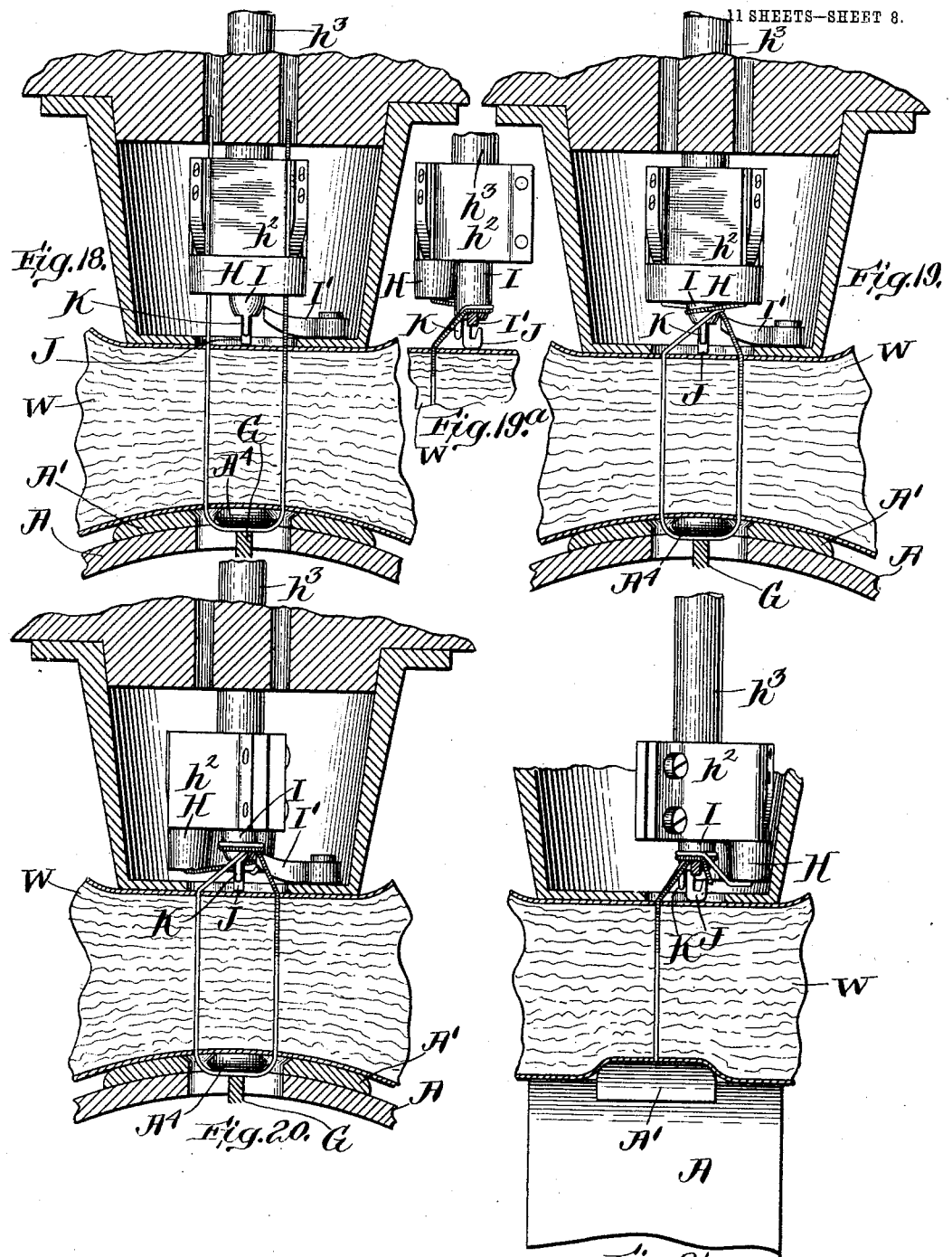

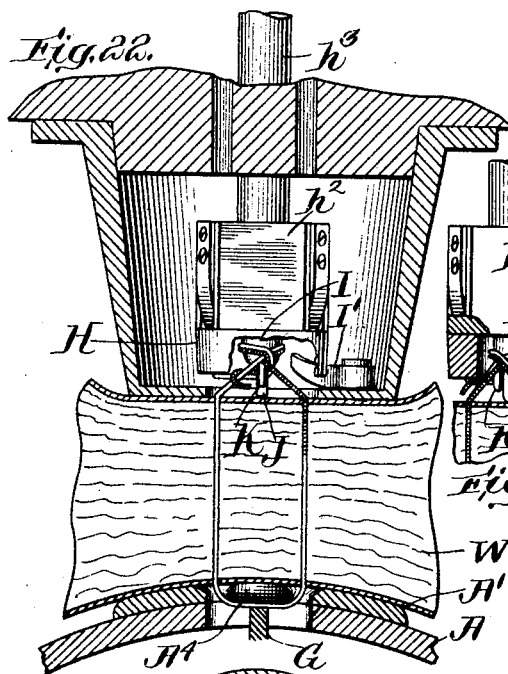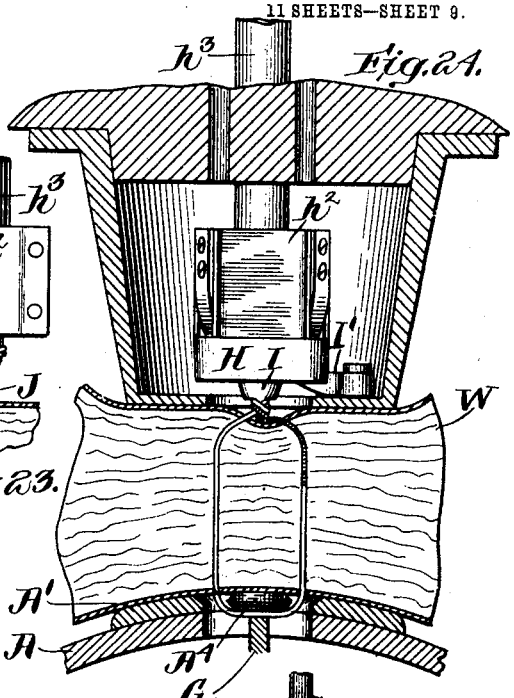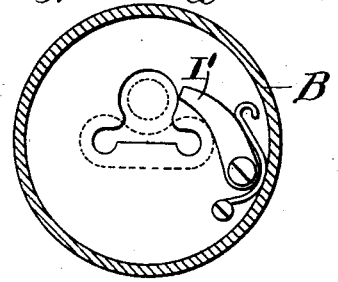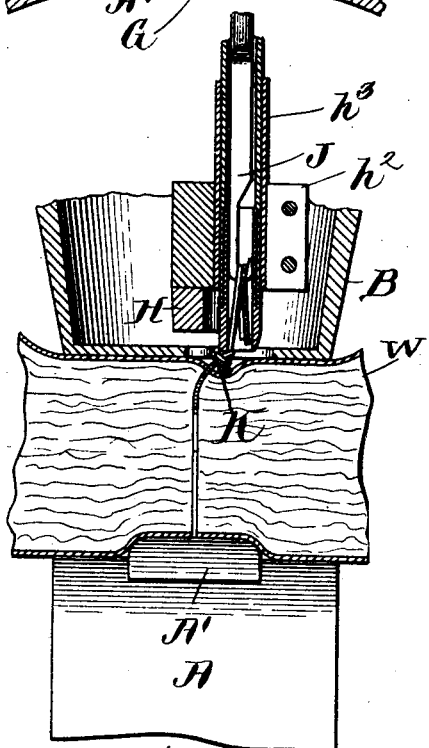

No. 784,749. PATENTED MAR. 14, 1905.
S. A. MILLER & C. B. GILMORE.
LOOPING AND TYING MACHINE.
APPLICATION FILED OCT. 6, 1902.
11 SHEETS—SHEET 10.
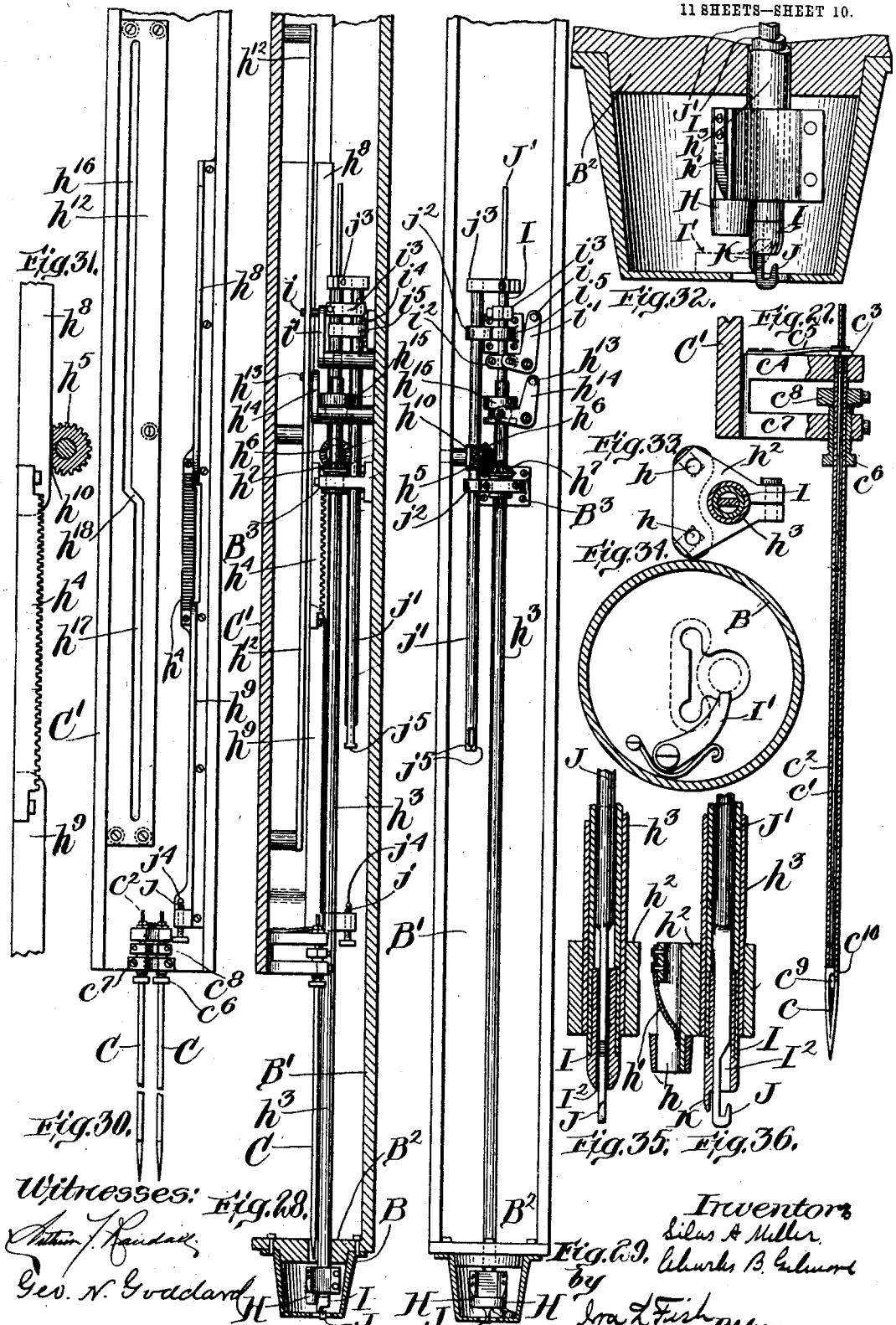

No. 784,749. PATENTED MAR. 14, 1905.
S. A. MILLER & C. B. GILMORE.
LOOPING AND TYING MACHINE.
APPLICATION FILED OCT. 6, 1902.
11 SHEETS—SHEET 11.
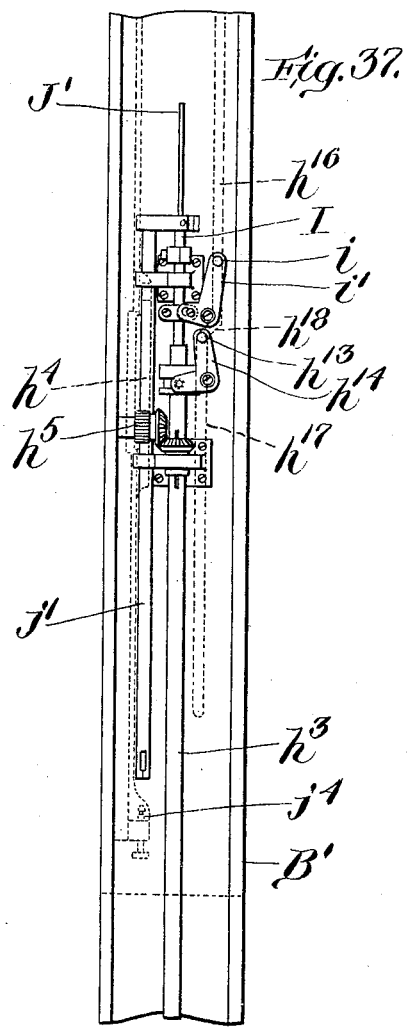
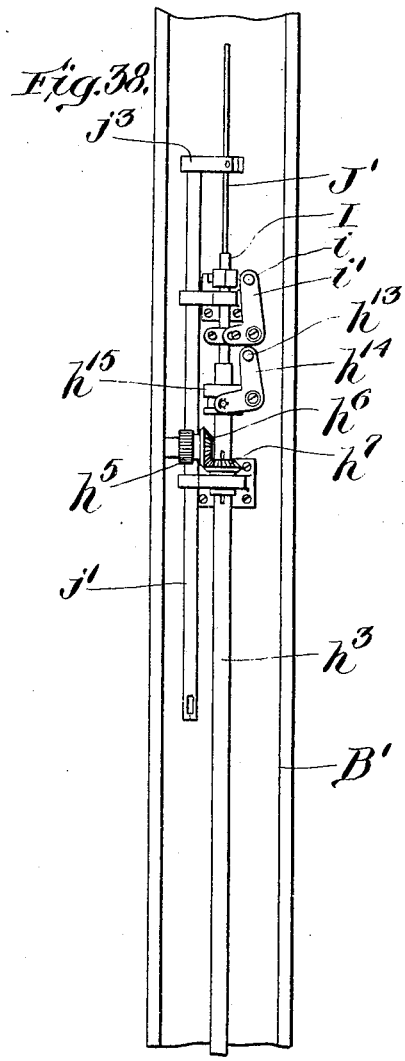
Witnesses:
Arthur J. Randall
Geo. N. Goddard
Inventors
Silas A. Miller
Charles B. Gilmore
by Ira L. Fish
Attorney.

No. 784,749. Patented March 14, 1905.

UNITED STATES PATENT OFFICE.

SILAS A. MILLER AND CHARLES B. GILMORE, OF BOSTON, MASSACHUSETTS, ASSIGNORS, BY MESNE ASSIGNMENTS, TO PALMER BROTHERS COMPANY, (INCORPORATED,) OF NEW LONDON, CONNECTICUT.

LOOPING AND TYING MACHINE.

SPECIFICATION forming part of Letters Patent No. 784,749, dated March 14, 1905.

Application filed October 6, 1902. Serial No. 126,225.

*To all whom it may concern:*

Be it known that we, SILAS A. MILLER and CHARLES B. GILMORE, of Boston, in the county of Suffolk and State of Massachusetts, have invented certain new and useful Improvements in Looping and Tying Machines, of which the following is a specification.

It is customary in manufacturing mattresses, upholstery, and various articles to connect the opposite sides of the work at various points by means of ties consisting of cords, tapes, or other forms of thread having their ends passed through the work at different points and tied together so that the middle part of the thread at one end of the loop extending through the work lies on one surface of the work, while the knotted ends at the other end of the loop lie upon the opposite surface of the work, and thus the opposite sides of the work are held in proper relation to each other. The forming and tying of these loops is termed "tying down" the work, and the present invention relates more especially to mechanisms for performing these operations. With these mechanisms the thread from which the tie-loops are formed is supplied on one side of the work and the ends of a length of thread are carried through the work to the opposite side, where they are tied together. The means for carrying the ends of the thread through the work may be constructed and operated to carry the ends either successively or simultaneously through the work, although the rapidity of the operation of looping the thread through the work will be increased and the construction and operation of the mechanism simplified by carrying the ends simultaneously through the work while it is held in a fixed position. The specific construction of the device or devices which engage the thread in carrying the ends through the work is not material to the broad scope of our invention. A simple and efficient device for this purpose, however, and the one which we prefer to use is a needle so constructed that it may be reciprocated through the work. In the machine in which we have embodied the various features of our invention we employ two needles for simultaneously carrying the ends of the thread through the work, and we provide these needles with open eyes or hooks, into which the thread may be carried laterally. To facilitate the passage of the needles through the work and to avoid danger of a needle catching in the work or carrying a part of the material along with it when operating upon fibrous materials, we provide the needles with means for closing the eyes during the passage of the needles through the work. The needles are arranged on the opposite side of the work from the thread-supplying mechanism and are advanced through the work until the eyes are upon the thread-supply side in position to receive the thread. After the thread is supplied to the needles they are retracted and carry the ends of the thread through the work and deliver them to knotting mechanism, which ties the ends together. In tying down mattresses and other upholstered articles for the best results the knot must be tied at the point where the material is compressed or held, and we have accordingly provided means for compressing the work to the desired extent and for then tying the knot substantially at the face of one of the compressing devices or at the point of compression, thereby securing the desired result. In order to complete the knot as close to the work as practical, we have so constructed the knotting mechanism that it moves toward the work during the knotting operation, so that the knot is completed close to the surface of the work. By varying the relative positions of the knot-tying mechanism and the thread-supplying mechanism when in operating position tie-loops of different lengths may be formed, thus adapting the same machine to operate upon different thicknesses of work. Since an adjustment in the position of the thread-supply mechanism would also involve an adjustment in the thread-carrying mechanism, this variation may more readily be obtained by varying the operative position of the knotting mechanism.

It will be understood that those features of invention relating to the mechanism for passing the ends of the thread through the work and to the mechanism for supplying the thread may, if desired, be embodied in constructions in which the threads are not tied together and that the features relating to the knotting mechanism may be embodied in any construction wherein a simple and efficient knotting mechanism is desired.

The various features of our invention will be best understood from a detailed description of the machine in which we have embodied all these features in the forms in which we prefer to construct them, which machine is shown in the accompanying drawings.

Figure 9:
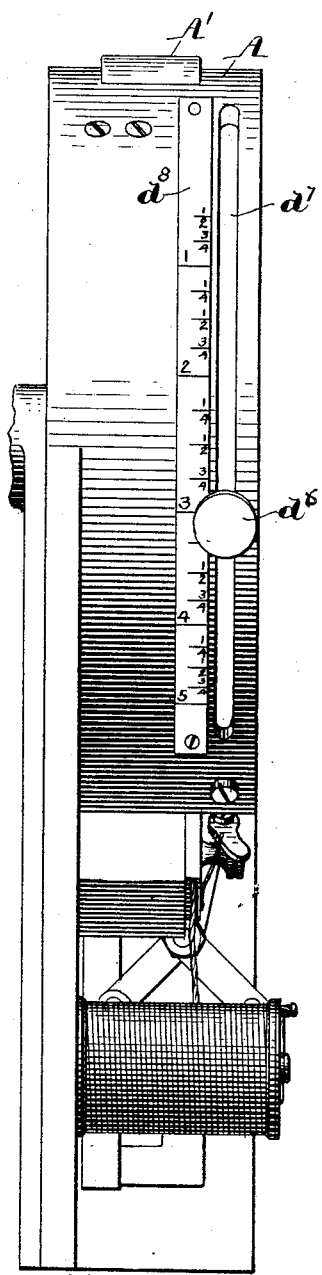
Figure 10:
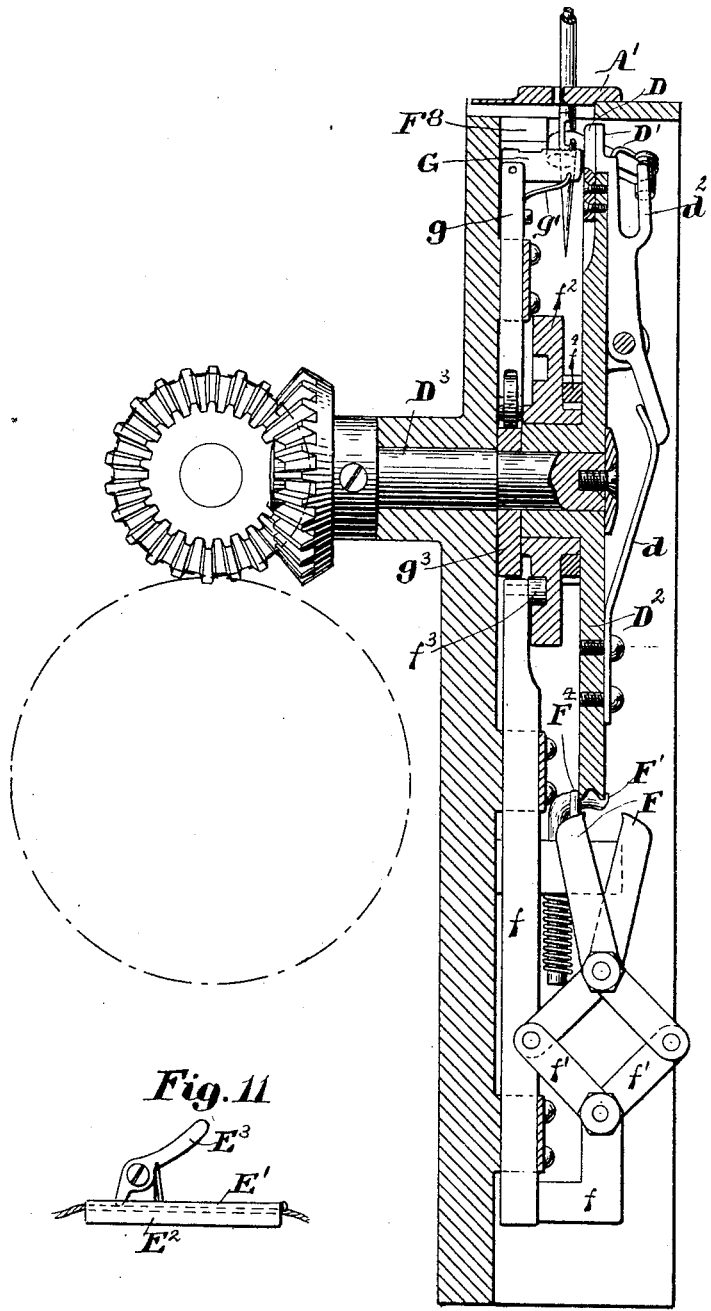
Figure 11:
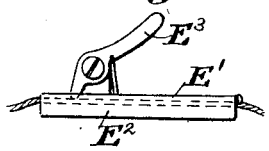
Figure 12:
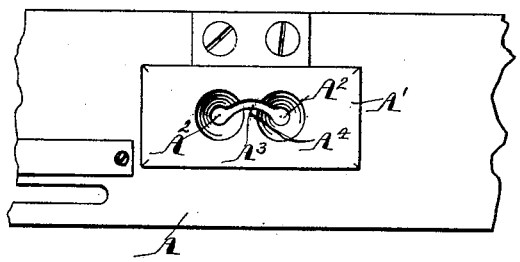
Figure 13:
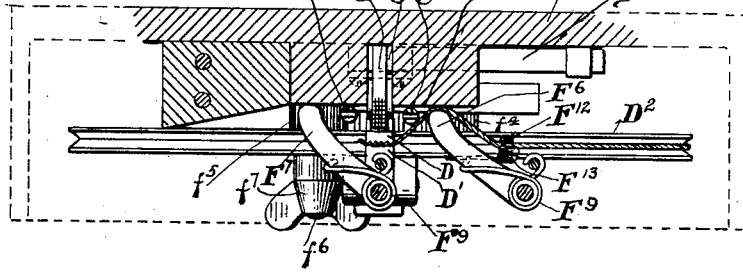
Figure 14:
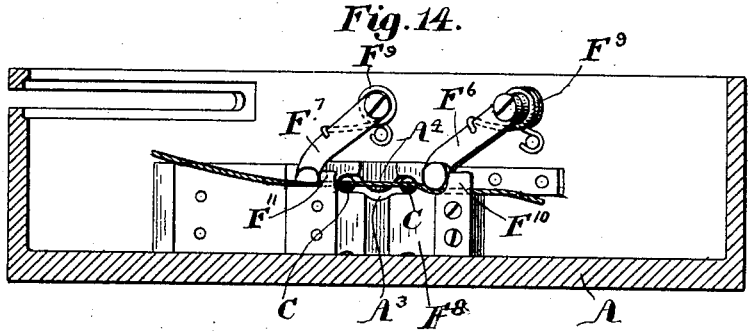
Figure 16:
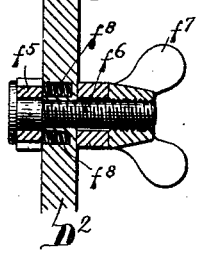
Figure 15:
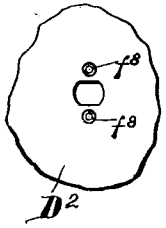

In the drawings, Figures 1 and 1ª show a side view of the machine. Fig. 2 is a front view of the needle and presser-foot slides. Figs. 3, 4, 5, and 6 are details of operating mechanism to be described. Fig. 7 is a front elevation of the thread-supplying mechanism, showing the parts in normal position. Fig. 8 is a similar view showing the position of the parts while the ends of the thread are being drawn through the work. Fig. 9 is a side elevation of the same. Fig. 10 is a vertical section through the same. Fig. 11 is a detail of the finger for holding the end of the supply-thread. Fig. 12 is a partial plan view of the work-plate which forms the casing for the thread-supply mechanism. Fig. 13 is a horizontal sectional view through the eyes of the needles, Fig. 10. Fig. 14 is a view looking up toward the under side of the work-plate. Figs. 15 and 16 are details of a cam-adjusting device. Fig. 17 is a view looking toward the back of the thread-supply mechanism, showing the position of the threading mechanism and the knotting mechanism after a length of thread has been supplied to the needles and before the thread-supply mechanism has completed its movement from the position of Fig. 7 to the position of Fig. 8. Figs. 18 to 26 are views illustrating the operation of forming the tie-loop and knotting the threads together. Fig. 27 is a detail of the needles. Fig. 28 is a sectional view through the presser-foot slide and needle-slide. Fig. 29 is a view looking toward the right, Fig. 28, with the needle-slide removed, showing the devices carried by the presser-foot slide. Fig. 30 is a view looking toward the left, Fig. 2, with the presser-slide removed, showing the devices carried by the needle-slide. Fig. 31 is a detail of devices carried by the needle-slide. Fig. 32 is a view showing the knotting devices within the presser-foot. Figs. 33 to 36 are details of said devices. Figs. 37 and 38 are views showing the operation of the devices carried by the needle and presser slides for operating the knotting mechanism.

In the machine shown the work W rests upon a work-plate A, and its upper surface is engaged by a presser-foot B, carried by a reciprocating slide B', guided in an overhanging arm of the frame. The slide B' is normally raised and may be depressed to compress the work between the presser-foot and work-plate to any desired extent. While the work is held between the work-plate and presser-foot the needles C, which are carried by a reciprocating slide C', also guided in the arm of the frame, are forced downward through the material until the eyes of the needles are in position below the work-plate A. A thread-feeding mechanism located below the work-plate then acts to introduce a suitable length of thread into the eyes of the needles, after which the needle-slide moves upward. The upward movement of the needles draws the ends of the thread through the work, and as the needles emerge from the work they deliver the threads to the knotting mechanism, which is carried by the slide B' and is located just above the bottom plate of the presser-foot B. During the continued upward movement of the needle-carrying slide C' the knotting mechanism operates to tie the threads together close down to the work, after which the slide B' moves upward, so that the work may be moved preparatory to another cycle of operations.

The needles C, Fig. 27, comprise point-pieces $c$, having shanks $c'$ of smaller diameter, upon which are mounted tubes $c^2$ of the same diameter as the point-pieces $c$. The shanks of the needles are provided at their upper ends with nuts $c^3$, which are held in engagement with an arm $c^4$ on the slide C' by a leaf-spring $c^5$. The tubes $c^2$ extend up through sleeves $c^6$, screwed into an arm $c^7$ on the slide C', and are secured in a block $c^8$, which lies between the ends of sleeves $c^6$ and the arm $c^4$. The point-pieces $c$ are provided with eyes $c^9$, having open sides arranged to be closed by lips $c^{10}$ on the lower ends of the tubes. When the needles are being thrust through the work, the resistance to their passage forces the point-pieces and tubes upward against the force of spring $c^5$ until the block $c^8$ strikes the arm $c^4$. When the points $c$ have passed through the work, the spring $c^5$ forces them downward relative to the tubes $c'$, which are held by the work, thus opening the eyes of the needles $e$ for the reception of the thread, which is introduced laterally through the open sides of the eyes, Figs. 7 and 17. When the needles start upward, the eyes are closed by the upward movement of the points relatively to the tubes, which are held by the work until the block $c^8$ strikes the sleeves $c^6$, after which the tubes and points move upward together, Fig. 8.

The work-plate A, upon which the work rests, is curved to form a casing for the mechanism which supplies the thread to the eyes of the needles, and a plate A' is secured to the plate A and forms a lower presser-foot for coöperating with the presser-foot B in compressing the work, Figs. 7–17. The plate A, Fig. 12, is provided with two holes A² for the passage of the needles C, and these openings are connected by a slot A³, through which the loop formed by drawing upward the ends of the thread may pass after the ends have been tied together above the work. The slot $A^3$ is curved, so that a horn $A^4$, Fig. 14, is formed between the holes $A^2$, against the lower side of which the middle of the thread may be held during the drawing of the ends through the work and the knotting operation. When the needles are in their lower position, they extend through the plate A, with their open eyes in position to receive the thread, Figs. 7 and 17. While the needles remain in this position the thread is carried across the front of the needles by a traveling gripper and the middle portion of the thread is introduced into the needle-eyes by passing it laterally into the open sides of the eyes. The gripper for carrying the thread consists of two jaws carried on a disk $D^2$, which is secured upon a shaft $D^3$. The jaw D, Fig. 10, is fixed to the disk, and the jaw D' is pivoted to the disk and is pressed toward the jaw D by a spring $d$. The thread is led from a thread-supply spool E through the slot E' of a thread-holding block $E^2$, in which it is held by a spring-pressed tension-finger $E^3$, Fig. 11. The end of the thread extends beyond the end of the block $E^2$ into position to be grasped by the gripper as the disk $D^2$ revolves. The jaw D' is opened as the gripper approaches the end of the thread by means of a cam $d'$, arranged to operate on an arm $d^2$ of the jaw D' and open said jaw, so that the jaws of the gripper will pass on opposite sides of the thread end. As the arm $d^2$ passes down the incline $d^3$ of the cam $d'$ the jaw D' is closed to grip the thread, Fig. 8. With this construction and arrangement of the traveling gripper the gripper travels in a direction along the thread toward its free end in coming into position to grip the thread, thus insuring the proper action of the gripper under all conditions and whether using one or a number of threads. As the gripper moves forward from the position of Fig. 8 it carries the thread between the blades of a cutter F. A guide-finger F' is located directly in front of the cutter and serves to direct the thread between the cutter-blades as the gripper advances and the thread is wound about the grooved periphery of the disk $D^2$. This guide-finger extends laterally from a shaft $F^2$, mounted in a block $F^3$, and is held yieldingly in position against a stop-pin $F^4$ by a torsional spring $F^5$ on the shaft. When the gripper advances from the position of Fig. 8, the jaw D strikes the finger F', which yields until the gripper has passed, when the finger springs back in the rear of the gripper and above the thread. The gripper is arranged to travel past the front of the needles, and the thread is directed laterally into the thread-eyes by two guiding-fingers $F^6$ $F^7$, arranged to engage the thread on opposite sides of the needles. The fingers $F^6$ and $F^7$ are pivoted on the plate A and are pressed against a block $F^8$ by springs $F^9$. As the gripper passes finger $F^6$ the finger yields to allow the gripper to pass and then springs forward, engaging the thread in the rear of the gripper and carrying it laterally against the block $F^8$ and above a guard-plate $F^{10}$, projecting from said block, Figs. 13 and 14. As the gripper passes the finger $F^7$ this finger yields to allow the passage of the gripper and then springs forward against the thread, carrying it laterally against the block $F^8$. This movement carries the thread, which extends between fingers $F^6$ and $F^7$ laterally, into the needle-eyes, and during the onward movement of the gripper the thread travels longitudinally through the needle-eyes, being guided by the fingers $F^6$ and $F^7$ and the guard-plates $F^{10}$ and $F^{11}$ on the block $F^8$. When the required length of thread has been drawn from the thread-supply, the cutter F is operated to sever the thread. This is effected by the movement of a slide $f$, Fig. 10, connected with the lower ends of the cutter-blades by links $f'$. The slide is operated by a cam $f^2$, connected to the disk $D^2$ and engaging a roll $f^3$ on the slide $f$. The cam $f^2$ is mounted on the butt of disk $D^2$ and is connected with the disk $D^2$ by means of a gear $f^4$, secured to the cam, and a pinion $f^5$, Fig. 16, mounted on the disk. The teeth of the gear and pinion are slightly wedge-shaped, so that the gear may be firmly clamped in position by drawing the pinion toward the disk $D^2$. The pinion is carried on the end of a bolt $f^6$, which passes through a hole in the disk and is provided with a thumb-nut $f^7$. When the thumb-nut is loosened, the pinion is forced away from the disk $D^2$ by springs $f^8$, so that the gear and pinion are free to rotate. The gear may then be turned to adjust the cam $f^2$ for the desired length of thread, depending on the thickness of the work. Access to the gear $f^4$ may be had through an opening $f^9$ in the disk $D^2$, and the gear may be provided with figures coöperating with a pointer $f^{10}$, Fig. 7, in indicating the adjustments for different lengths of thread. After the proper adjustment is made the cam is clamped in position by tightening the thumb-nut $f^7$. The gripper continues to draw forward the thread until the ends of the thread extend substantially equal distances on opposite sides of the needles. The gripper is then opened by a cam $d^4$, which is engaged by the arm $d^2$, thus forcing the jaw D' away from jaw D. The cam $d^4$ is formed on a block $d^5$, which is guided in a groove on the inner surface of the plate A and is held in position by a binding-screw $d^6$ extending through a slot $d^7$ in plate A. By loosening the screw $d^6$ the cam $d^4$ may be adjusted to open the grippers at the proper time when operating with different lengths of thread, and the plate A may be provided with a scale $d^8$, Fig. 9, indicating the various adjustments.

In some cases the length of thread being used may be such that the thread will be cut before the leading end has been carried under the finger F⁶ by the gripper, and in such case the thread might fall out of the groove in the disk D² and not be properly acted upon by the fingers F⁶ and F⁷. To avoid any danger of such failure to properly present the thread, retaining devices are located on the disk back of the gripper, which holds the thread in proper position to be engaged by the finger F⁶. These devices consist of a fixed finger F¹², Fig. 13, and a spring-finger F¹³, between the ends of which the thread passes as it winds upon the disk back of the gripper.

The disk D² normally stands in the position shown in Fig. 7 and remains in this position until the needles have reached their lower position. The disk then makes a half-revolution to supply the thread to the needle-eyes and to bring the gripper into engagement with the free end of the supply-thread, as shown in Fig. 8. As the disk comes into this position the thread lying between the needles is carried up and held against the horn A⁴ by a clamp G. The clamp G, Fig. 10, is pivoted on the end of a slide $g$ and is supported by a spring $g'$. The slide $g$ is forced upward against the action of a leaf-spring $g^2$, Figs. 7 and 8, by a cam $g^3$ on the shaft D³. The cam $g^3$ is so located that it operates the clamp as the disk comes into the position of Fig. 8, and it holds the clamp in position until the disk starts forward from this position. After the disk D² has come into the position of Fig. 8 it remains in this position while the needles draw the ends of the thread up through the work and while the ends of the thread are being tied together. As the tying operation is completed the disk D² starts forward and advances to the position of Fig. 7, where it remains until the next cycle of operations are performed. The movement of the cam $g^3$ when the disk D² starts forward allows the slide $g$ to move downward, thereby disengaging the clamp G from the thread, so that it may pass up through the slot A³ as the work is moved. In their downward movement the needles pass through the thread-holders H, Fig. 17, of the knot-tying mechanism and on the upward movement of the needles they deliver the ends of the thread to these holders. The thread-holders consist of two tubes $h$, Figs. 33 and 36, each of which is provided with a spring-finger $h'$ for gripping the thread and holding it against the wall of the tube. The tubes $h$ are formed in a block $h^2$, secured to the lower end of a sleeve $h^3$, which is journaled in the plate B² at the lower end of the slide B' and in a bracket B³, secured to said slide, Fig. 29. The thread-holders, as well as the other devices which act upon the threads in tying them together, are located within the presser-foot B, Fig. 32, which is in the form of a casing surrounding said parts and having openings in its bottom plate for the passage of the needles and parts of the knot-tying mechanism. On the downward movement of the needles the spring-fingers $h'$ yield to allow the passage of the needles, and on the return stroke of the needle the fingers spring forward to engage the thread as soon as the needle-points have passed and hold the thread with a tension dependent upon the tension of the springs. The position of the holders and the threads after the needles have delivered the ends of the thread to the holders is shown in Fig. 18. As the slide C' continues its upward movement after the needle-points have been withdrawn from the holders H the sleeve $h^3$ is rotated and during its rotation the thread-holders act as wrapping-carriers to wrap the threads about a post or knotter tube I. The tube I is mounted within the sleeve $h^3$ and its lower end projects down into the path of the threads as they are carried around by the carriers H. As the threads are wrapped about the tube I they pass over a spring-pressed finger I', which retains the threads in place upon the tube, so that they do not slide down over the end of the tube. The position of the parts after one revolution of the thread-carriers is shown in Figs. 19 and 19ᵃ. The thread-carriers continue to rotate and pass over the finger I' a second time, thus forming a loop about the knotter-tube I, as indicated in Figs. 20 and 21. As the thread-carriers pass over the finger I' the second time the sleeve $h^3$ is moved downward, Figs. 20 and 21, so that in completing their second revolution the thread-carriers lay the threads across the end of the tube I and into the thread-drawing hook J, Figs. 22 and 23. In completing this second revolution the thread-carrier H at the right in Fig. 22 also strikes the retaining-finger I' and moves it back, so that the loop about the tube I may draw down off the end of the tube. The hook J is formed on the end of a rod J', which extends up through the tube I, Figs. 35 and 36, and as the thread-carriers H complete their rotation the rod J' is drawn upward, carrying the thread ends through the loop on the tube I and into the slot I² at the lower end of the tube, Figs. 24 and 25. The slot I² is of such size that the threads are clamped to a certain extent between the sides of the hook and the sides of the slot, so that the hook exerts a pull upon the threads, the force of which will depend upon this clamping effect. The pull of the hook upon the threads draws the loop about the tube I down off the end of the tube and at the same time the tube is moved downward toward the work, so that as the knot is tightened it is carried down close to the surface of the work, Figs. 24 and 25. The knot may be tightened against the end of the tube I and the downward movement of the tube in such case will carry the loop of the knot down close to the work. In thus tightening the knot when using comparatively small thread the knot may sometimes enter the slot in the end of tube I to a greater or less extent, thereby modifying the position of the knot or interfering with the proper tightening of the knot. To avoid this, when using small-sized thread and to insure a uniform and definite location and tightening of the knot at each operation, we prefer to provide a pin about which the knot is tied and tightened. This pin K we have formed on the lower end of the tube I, and as the loop passes down off the end of the tube it passes onto the pin and is drawn tight about the pin, as shown in Figs. 24 and 25. After the knot has been tightened either about the pin K or against the end of the tube I the slide B' is returned to its initial upper position.

For the sake of simplicity in the construction of the devices for giving to the parts of the knot-tying mechanism the proper movements these devices are mounted upon the slides B' and C' and are so arranged that they are operated by relative movement between the two slides, Figs. 28 to 31 and 37 and 38. The sleeve $h^3$ is rotated to wrap the threads about the knotter-tube by a rack $h^4$, secured to the slide C' and arranged to engage a pinion $h^5$, which is connected through bevel-gears $h^6$ $h^7$ with the sleeve $h^3$. The pinion $h^5$ and gear $h^6$ are secured together and turn freely on a stud mounted in the slide B'. The gear $h^7$ is journaled in the bracket $B^3$ and is connected with the sleeve $h^3$ by a key-and-slot connection which allows the sleeve to move longitudinally through the gear. When the sleeve $h^3$ is not being rotated, it is held in position with the thread-holders H in line with the needles C by means of one or the other of two locking-ribs $h^8$ $h^9$, arranged to engage and move through a recess $h^{10}$, formed in one side of the pinion $h^5$. When the needles are being thrust through the work and being drawn back, the upper locking-rib $h^8$ holds the pinion, and hence the sleeve $h^3$, in fixed position. After the slide C' has moved upward far enough to withdraw the needles from the thread-holders H the rib $h^8$ passes out of recess $h^{10}$, and the rack $h^4$ engages the pinion $h^5$ and rotates the sleeve $h^3$ during the continued upward movement of slide C'. As the pinion $h^5$ completes its second revolution the rack disengages the pinion and the lower locking-rib $h^9$ enters the recess $h^{10}$ and holds the pinion and sleeve $h^3$ in position during the remainder of the upward movement of the slide C'. The sleeve $h^3$ is moved downward during the latter part of its second revolution by a cam-slot formed in a plate $h^{12}$, carried by slide C'. This slot is engaged by a pin $h^{13}$, secured to one end of a bell-crank lever $h^{14}$ on the slide B', the other end of which is provided with a pin which engages an annular groove in a collar $h^{15}$, secured to the sleeve $h^3$. The cam-slot has two straight parts $h^{16}$ and $h^{17}$ and an inclined part $h^{18}$. During the first revolution of sleeve $h^3$ and part of the second revolution the pin $h^{13}$ rides in the part $h^{16}$ and enters the part $h^{18}$ during the second revolution of sleeve $h^3$. This inclined part $h^{18}$ rocks the lever $h^{14}$ to depress the sleeve $h^3$, Fig. 37, after which the pin $h^{13}$ rides in the straight part $h^{17}$ during the remainder of the upward movement of the slide C'.

The rod J' is operated to draw the hook J into the wrapping-tube by the action of a lug $j$ on the slide C', which engages the lower end of a slide-rod $j'$, mounted in guides $j^2$ on the slide B' and connected with the upper end of rod J' by an arm $j^3$. The lug $j$ is in the form of an adjustable screw, the upper end of which is provided with a conical button $j^4$, arranged to pass between spring-jaws $j^5$, formed on the lower end of the rod $j'$. The jaws and conical button form a detachable connection between the slide C' and the slide-rod $j'$. The screw $j$ is so located that it engages the end of rod $j'$ at the completion of the rotary movement of sleeve $h^3$. Just after the screw $j$ engages rod $j'$ and begins to lift the hook-rod J' the knotter-tube I is depressed by the action of the incline $h^{18}$ on a pin $i$, carried by one end of a bell-crank lever $i'$, the other end of which is connected by a pin-and-slot connection with a collar $i^2$, secured on the tube I. After the tube I has been depressed the pin $i$ rides on the straight part $h^{17}$ of the cam-slot during the remainder of the upward movement of slide C', Fig. 38. The tube I is held from rotation by an arm $i^3$, secured to its upper end and provided with a pin $i^4$, which engages a hole in the bracket $i^5$, Fig. 28. When the slide B' is raised after the completion of the knot-tying, the upward movement of slide B' relatively to slide C' causes the bell-crank levers $h^{14}$ and $i'$ to be operated in the opposite direction, thus raising the tube I and sleeve $h^3$ into normal position. The thread-holders are also rotated in reverse directions during this movement of the slide B', and the rod $j$ is drawn downward through its guides by reason of the engagement of the spring-jaws with the end of screw $j$ until the arm strikes the end of tube I, when the screw releases itself from the jaws, Fig. 28.

The needle-carrying slide C' is operated by a cam $C^2$, secured to a shaft $C^3$ and arranged to act upon one end of a bell-crank lever $C^4$, the other end of which is connected with the slide C', Figs. 1 to 6. The upper end of slide C' may be provided with a stop (not shown) for engaging the upper end of the guides in which the slide is mounted when the slides C' are in their lower position, and thus accurately defining the position of the needles at each operation.

The slide B' is operated by a cam $B^4$, secured to a shaft $B^5$ and arranged to operate a bell-crank lever $B^6$, the front end of which is connected with the slide B'. The connections between the ends of the lever $B^6$ and the slide B' and cam $B^4$ are so constructed that the downward movement of the slide B' may be varied for different thicknesses of work or to vary the degree to which the work is compressed between the foot B and the plate A. The cam $B^4$ acts upon a roll $B^7$, Figs. $1^a$ and 3, mounted on a stud $B^8$, carried by a lever $B^9$, pivoted at $B^{17}$, which is substantially parallel to and of the same length as the rear arm of lever $B^6$. The rear arm of lever $B^6$ is connected with the lever $B^9$ by means of links $B^{10}$. These links are connected with the lever $B^9$ by eccentrics $B^{11}$, secured to the stud $B^8$. By adjusting these eccentrics the relation between the levers $B^6$ and $B^9$, and consequently the relation between the cam $B^4$ and lever $B^6$ may be varied. The eccentrics are adjusted by means of a handle $B^{12}$, secured to stud $B^8$, the various positions of the handle for the different adjustments being indicated by a series of holes in a segment $B^{13}$. To adjust the eccentrics, the nut $B^{15}$ is loosened and the handle $B^{12}$ moved until it engages a pin $B^{16}$, inserted in one of the holes in segment $B^{13}$, after which the nut $B^{15}$ is tightened to clamp the eccentrics to the lever $B^8$. With this form of connection between the lever $B^6$ and the cam $B^4$ the lever will be moved to substantially the same extent whatever the adjustment, although the positions of the lever when at the limits of its movements will vary with the different adjustments. The slide $B'$ is so mounted that it is always raised to the same initial position, and consequently the connection between the end of the lever $B^6$ and the slide $B'$ is such that the lever may continue its upward movement after the slide has come to its upper position, provided the adjustment of the lever requires such independent movement. The slide $B'$ is connected with the lever through a block $b$, Fig. $1^a$, pivoted on the slide and arranged to work in a slot in the end of lever $B^6$. The lower side of the slot in the lever is formed by a jaw $b'$, pivoted at $b^2$ to the end of the lever and normally held in parallel relation to the fixed upper jaw $b^3$ of the slot by means of a spring-pressed locking-pin $b^4$. The pin $b^4$ is mounted in the fixed jaw $b^3$ and engages a slot $b^5$, formed in a plate $b^6$, connected with the pivoted jaw. The plate $b^6$ is carried by an arm $b^7$, rising from the pivoted jaw and is arranged between the jaw $b^3$ and the slide $B'$. The plate $b^6$ is also provided with a ledge $b^8$, which projects from the inner side of the plate and is arranged to engage the under side of a pin $b^9$ on the slide $B'$. The ledge $b^8$ forms a continuation of the side of slot $b^5$, as shown in Fig. 6. As the slide $B'$ reaches its upper position the end of the locking-pin $b^4$ rides over the inclined end of a pin $b^{10}$, carried by an arm $b^{11}$, secured to the frame and arranged to enter the slot $b^5$ as the lever $B^6$ moves upward. As the pin $b^4$ rides over the end of pin $b^{10}$ the pin $b^4$ is forced back out of the slot $b^5$, thus unlocking the jaw $b$, so that it may swing on its pivot as the lever $B^6$ continues its upward movement. When the lever $B^6$ has moved the slide $B'$ to its upper position, the pin $b^9$ is directly back of pin $b^{10}$, Fig. 6, and is sustained in this position by the ledge $b^8$, which will slide along under the pin $b^9$ as the pin $b^{10}$ rides in slot $b^5$. During the upward movement of the arm $B^6$ after the locking-pin $b^4$ has been pressed back out of slot $b^5$, the jaw $b'$ will swing about the pivot $b^2$, its movement being controlled by the pin $b^{10}$, working in slot $b^5$, Fig. 5. On the return movement of the arm $B^6$ the jaw $b'$ will be swung in the reverse direction about its pivot by the action of the pin $b^{10}$ in slot $b^5$ until the jaw $b'$ is in parallel relation to the jaw $b^3$ with the block $b'$ between the jaws. As the jaw swings from the position of Fig. 5 to the position of Fig. 1 the pin $b^4$ rides over the beveled upper end of the plate $b^6$, Fig. 6, and slides along the surface of plate $b^6$ until it passes over the end of pin $b^{10}$ into the slot $b^5$ and locks the jaw $b'$ in the relation shown in Fig. 1. The distance the lever $B^6$ moves after the slide $B'$ has reached its upper position will depend upon the extent to which the slide $B'$ is to be depressed, being the greatest when the slide is to be depressed the least.

The thread-supplying mechanism is operated from an intermittently-rotating shaft $D^4$, Figs. 1 and $1^a$, which is connected with the shaft $D^3$ by bevel-gears $D^5 D^6$ and spur-gears $D^7 D^8$. The gear $D^8$ is twice the size of gear $D^7$, while the gears $D^5 D^6$ are the same size, and consequently the shaft $D^3$ is given a complete revolution for each half-revolution of shaft $D^4$. The shaft $D^4$ is given two quarter-revolutions during each revolution of the cam-shaft $B^5$ by the mechanism shown in Fig. 4. This mechanism consists of a disk $D^9$, secured to shaft $B^5$ and provided with two pins $D^{10}$, arranged to engage slots $D^{11}$ in a disk $D^{12}$, secured to shaft $D^4$. The shaft $B^5$ also carries two locking-segments $D^{13} D^{14}$, arranged to coöperate with locking-segments $D^{15}$ on disk $D^{12}$. The parts are normally in the position shown. When the cam-shafts $B^4$ and $C^3$ start forward, the locking-disk $D^{13}$ holds the threading mechanism stationary until the needles have come to their lowest position, and then the first pin $D^{10}$ engages a slot $D^{11}$ and turns shaft $D^4$ a quarter-revolution, thus moving the threading mechanism from the position shown in Fig. 7 to the position of Fig. 8. The locking-segment $D^{14}$ then holds the mechanism in this position until the knotting mechanism has operated, and then the second pin $D^{10}$ engages a slot $D^{11}$ and gives the shaft $D^4$ a quarter-revolution to bring the threading mechanism into the position of Fig. 7. The cam-shafts $C^3$ and $B^5$ are geared together by a pinion L, meshing with gears $L' L^2$ on said shafts. These shafts are driven from a pinion $L^3$, loose on shaft $B^5$ and engaging a gear $L^4$, secured to a shaft $L^5$, which carries a pinion $L^6$, engaging gear $L^2$. The pinion $L^3$ is provided with one member of a clutch $L^7$, the other member of which is carried by a driving-pulley $L^8$, loose on the shaft $B^5$. The pulley is normally in the position shown with the clutch disengaged, being held in this position by the action of a spring $L^9$. This spring acts upon a rod $L^{10}$, connected to one arm of a bell-crank lever $L^{11}$, the other arm of which is connected by a pin-and-slot connection with the arm $L^{12}$ of a second bell-crank lever. The other arm, $L^{13}$, of this lever is provided with a yoke $L^{14}$, connected by pins $L^{15}$ with an annular groove in the hub of pulley $L^8$. A treadle $L^{16}$ is connected to the front end of the rod $L^{10}$, and by operating the treadle the bell-crank levers may be moved to slide the pulley $L^8$ on shaft $B^5$ and engage clutch $L^7$. This movement of the arm $L^{13}$ carries the pins $L^{15}$ forward out of engagement with the shoulders $L^{17}$ of a cam $L^{18}$, secured to shaft $B^5$, so that said shaft may move forward. As the shaft revolves the high part of the cam rides over first one of the pins $L^{15}$ and then the other and holds the pulley $L^8$ forward until the shaft $B^5$ has completed a revolution. As the shaft $B^5$ completes its revolution the cam $L^{18}$ comes into the position shown, and the pulley is moved back by the spring $L^9$ disengaging the clutch, the pins $L^{15}$ moving under the shoulders $L^{17}$ and locking the shaft $B^5$ in position. By operating the treadle $L^{16}$, therefore, the machine is thrown into operation and automatically performs its cycle of operation and then stops with the parts in their initial positions ready for the next cycle of operations.

The machine which we have shown and described is especially designed for compressing the work at a single point and forming and tying a single tie-loop at each operation. It will be understood, however, that the various features of the invention may be embodied in gang-machines in which a number of tie-loops are formed simultaneously. It will also be understood that the various features of the invention may be employed for other purposes than tying down mattresses and similar work and under any conditions where it is desirable to pass a thread or threads through any article or material and tie the threads together.

Where the term "thread" is used, it will be understood to refer to any suitable material which may be looped through the work—such as cord, twine, ribbon, tape, yarn, or the like—or two or more strands of such materials either wound together or laid alongside of each other.

We believe we are the first to provide a machine which meets the practical requirements for a successful machine for tying down mattresses and similar work, and we wish it to be understood that we do not intend in our claims to confine our invention to the precise mechanisms shown, but intend to include all constructions which perform the same work by combinations of mechanisms operating in substantially the same manner as the mechanisms shown and described.

What we claim, and desire to secure by Letters Patent, is—

1. The combination of mechanism for supplying a length of thread on one side of the work, means for carrying the free ends of the thread to the other side of the work, mechanism for knotting the ends of the thread, and means for varying the relative positions of the thread-supply mechanism and the knotting mechanism for loops of different lengths.

2. The combination of two needles, means for reciprocating them, mechanism for supplying a thread to said needles, mechanism for knotting the ends of said thread, and means for varying the relation between the thread-supplying mechanism and the knotting mechanism for loops of different lengths.

3. The combination of two needles, means for reciprocating them, mechanism for supplying a thread to said needles, mechanism for knotting the ends of said thread, and means for varying the tying position of the knotting mechanism for loops of different lengths.

4. The combination of two needles, means for reciprocating them, mechanism for supplying a thread to the needles, mechanism for knotting the ends of said thread, and a reciprocating slide carrying said knotting mechanism and means for reciprocating said slide.

5. The combination of two needles, means for reciprocating them, mechanism for supplying a thread to the needles, mechanism for knotting the ends of said thread, a reciprocating slide carrying said knotting mechanism, means for reciprocating said slide, and means for varying the reciprocation of said slide for loops of different lengths.

6. The combination of work-compressing devices, mechanism for supplying a length of thread on one side of the work, thread-carrying devices for carrying the free ends of said length of thread through the compressed material to form a loop through the work, and a knotting mechanism for tying the thread ends together to complete the loop and tie down the compressed work.

7. The combination of work-compressing devices, mechanism for supplying a length of thread on one side of the work, mechanism for simultaneously carrying the free ends of the thread through the compressed material to form a loop through the work, and a knotting mechanism for tying the thread ends together to complete the loop and tie down the compressed work.

8. The combination of work-compressing devices, two needles, mechanism for supplying a length of thread to said needles, mechanism for operating said needles to carry the ends of the length of thread through the compressed material to form a loop through the work, and a knotting mechanism for tying the thread ends together to complete the loop and tie down the compressed work.

9. The combination of work-compressing devices, mechanism for supplying a length of thread, means for carrying the free ends of said thread through the work to form a loop, and mechanism carried with a movable member of the compressing devices for knotting the ends of the thread.

10. The combination of a work-plate, a presser-foot coöperating therewith to compress the work, two reciprocating needles, mechanism for supplying a thread to the needles, and mechanism carried with the presser-foot for tying the ends of the thread.

11. The combination of two reciprocating needles having eyes open at the side, and means for closing said eyes during the passage of the needles through the work and opening said eyes after they emerge from the work, mechanism for introducing a thread into said eyes through the open sides, and mechanism for knotting the ends of said thread.

12. The combination of two reciprocating needles, mechanism for supplying a thread to the needles, thread-holders having thread-engaging devices between which the needles pass, and devices coöperating with said holders for knotting the thread.

13. The combination of two needles, means for reciprocating them, thread-carriers for receiving the ends of a thread carried by the needles, a knotter-tube, means for operating the carriers to wrap the threads about the tube, and means for drawing the thread ends through the loop about the knotter-tube.

14. The combination of two needles, means for reciprocating them, mechanism for supplying a thread to the needles, thread-holders through which the needles reciprocate, a knotter-tube, means for rotating the thread-holders to wrap the ends of the thread about the tube and means for drawing the ends of the thread through the loop formed on the tube.

15. The combination of a work-plate, two reciprocating needles, thread-supplying mechanism on one side of the work-plate, knot-tying mechanism on the other side of the work-plate, and mechanism for moving the knot-tying mechanism toward the work-plate during the knotting operation.

16. The combination of a work-support, means for carrying the ends of a thread through the work, and clamping members at one side of the work for engaging the thread and preventing lengthwise movement of the middle of the thread while the ends are being carried through the work.

17. The combination of a work-support, means for carrying the ends of a thread through the work, clamping members at one side of the work for engaging the thread and preventing lengthwise movement of the middle of the thread, and mechanism for knotting the thread.

18. The combination of a work-support, two reciprocating needles, mechanism for supplying a thread to said needles, clamping members at one side of the work for engaging the thread and preventing lengthwise movement of the middle of the thread, and mechanism for knotting the thread.

19. The combination of two needles, means for reciprocating them through the work, mechanism for supplying a thread to said needles, mechanism for knotting the threads, and means between the paths of the needles for preventing lengthwise movement of the thread during the passage of the needles through the work and during the knotting operation.

20. A needle-threading mechanism having in combination, a gripper for drawing the thread longitudinally and a yielding finger in the path of the gripper for engaging the thread and carrying it laterally.

21. A needle-threading mechanism having in combination, a gripper for drawing the thread longitudinally, means coöperating with the gripper to carry the thread laterally, a cutter, means for releasing the thread from the gripper, and means for varying the action of the cutter and of the releasing means for different lengths of thread.

22. A needle-threading mechanism having in combination, a gripper for drawing the thread longitudinally, a yielding finger in the path of the gripper, a device in the rear of the gripper for holding the thread in position to be engaged and carried laterally by said finger.

23. A needle-threading mechanism having in combination, a device for holding the free end of the supply-thread, a traveling gripper for drawing the thread longitudinally, cutter-blades between which the thread is drawn by the gripper, and a guide which moves in back of the gripper and guides the thread between the cutter-blades.

24. The combination of two reciprocating needles having eyes open at the side, a gripper for drawing the thread longitudinally across the needles, means coöperating with the gripper to carry the thread laterally through said open sides and devices between the paths of the needles for holding the thread as the needles draw the ends through the work.

25. The combination of two reciprocating needles, a horn between the paths of the needles, and a clamp for holding the thread to the horn.

26. The combination of two needles, means for reciprocating them, thread-holders to which the needles deliver the threads carried thereby, a knotter-tube about which the threads are wrapped by the holders, means for drawing the threads through the loop formed on the tube, and means for advancing the tube during the knotting operation.

27. The combination of a knotter-tube, means for wrapping the thread about the knotter-tube, means for passing the thread through the loop thus formed and casting the loop off the end of the tube, and means for advancing said tube during the knotting operation.

28. The combination of a wrapper, a knotter-tube around which the wrapper wraps the thread, means for casting the loop thus formed off the end of the tube, and means for moving the knotter-tube toward the work during the knotting operation.

29. The combination of a knot-forming mechanism, a pin about which the knot is formed, and means for tightening the knot while on the pin.

30. The combination of a knotting mechanism, a pin around which the knot is tied and means for moving said pin toward the work during the knotting operation.

31. The combination of a knotter-tube, a pin projecting from the end of said tube, means for wrapping the thread about the tube, and means for drawing the thread through the loop thus formed.

32. The combination of a knotter-tube, thread-carriers for wrapping the thread about the tube, a retaining-finger for holding the threads on the tube, a thread-drawing hook, and means for moving the thread-carriers to carry the threads into said hook and to disengage said retaining-finger.

33. The combination of two needles, means for reciprocating them, means between the paths of the needles for holding the thread, thread-holders through which the needles pass, a knotter-tube, means for rotating said holders about the knotter-tube, a loop-retaining finger, means for moving the holders longitudinally of the knotter-tube and a hook for receiving the threads and drawing them through the loop formed about the knotter-tube.

34. The combination of two needles, a reciprocating slide carrying the needles, knot-tying devices, a slide carrying the knot-tying devices, and mechanism carried by said slides and operated by relative movement between the same for operating the knot-tying devices.

35. The combination of two needles, means for reciprocating them, mechanism for supplying a thread to the needles, knot-tying mechanism and means for advancing said knot-tying mechanism toward the work during the knotting operation.

36. The combination of mechanism for looping a thread through the work, mechanism for knotting the ends together and means for carrying the knotting mechanism toward the work during the knotting operation.

37. The combination of mechanism for looping a thread through the work, mechanism for knotting the ends together and mechanism for carrying the loop of the knot toward the work as the ends of the thread are drawn through said loop in tightening the knot.

38. The combination of a work-support, mechanism for looping a thread through the work, clamping members at one side of the work for engaging the thread at the end of the loop and preventing lengthwise movement thereof as the ends of the thread are drawn through the work, and mechanism for knotting the thread.

39. The combination of a work-plate, a thread-supply mechanism on one side of the plate, a presser-foot on the other side of the work-plate, thread-carrying means, mechanism for advancing said thread-carrying means through the work and into position to receive the thread, and for retracting the same to carry the ends of the thread through the work, and mechanism moving with the presser-foot for forming a knot in the threads.

40. The combination of work-compressing devices, a thread-carrier, means for feeding a length of thread to said carrier, means for actuating said carrier to take the two ends of said thread through the work at the point where it is compressed, and a knotting mechanism to tie said ends close to said compressed surface of the work.

41. The combination of work-compressing members, means for carrying a thread through the work, mechanism for knotting the ends of the thread at the face of a compressing member before the work is released, and means for varying the distance apart of said knotting mechanism and the opposed work-compressing member.

42. The combination of compressing devices between which the work is compressed, means for piercing the work and forming a loop therethrough, knotting mechanism within one of the compressing devices, and means for operating the knotting mechanism to tie the knot at the face of the compressing device before the work is released.

43. The combination of compressing devices, two needles for carrying a length of thread through the work, knotting mechanism to tie the ends of the said thread and means for operating the knotting mechanism to tie the knot at the face of one of the compressing devices.

44. The combination of means for carrying a length of thread through the work, a wrapper to which the ends of the thread are delivered, a post around which the threads are wrapped, a hook, means for moving the wrapper longitudinally of the post to lay the threads in the hook, and means for causing the relative movement between the hook and post to draw the threads through the loop formed about the post.

45. The combination of a work-plate, two reciprocating needles, thread-supplying mechanism on one side of the work-plate, knot-tying mechanism on the other side of the work-plate embodying a knotter-tube around which the knot is formed, and mechanism for moving the knotter-tube toward the work-plate during the knotting operation.

46. The combination of adjustable means for supplying threads of different length, means for carrying the two ends of the thread through the work, a clamp to hold the middle of the thread, knotting mechanism and means for moving the knotting mechanism toward the work during the knotting operation.

47. The combination of adjustable means for supplying a thread of the required length, means for carrying the two ends of the thread through the work, knotting mechanism, and means for moving the knotting mechanism toward the work during the knotting operation.

48. The combination of devices for compressing the work, adjustable means for supplying different lengths of thread, needles for carrying the two ends of the thread through the work at the point of compression, knotting mechanism and means for operating the knotting mechanism to tie the knot at the point of compression.

49. The combination of devices for compressing the work, adjustable means for supplying different lengths of thread, needles for carrying the two ends of the thread through the work at the point of compression, a clamp to hold the middle of the thread, knotting mechanism and means for operating the knotting mechanism to tie the knot at the point of compression.

50. The combination of a work-support, two reciprocating thread-carriers, and clamping members at one side of the work for engaging the thread and preventing lengthwise movement of the thread between the carriers.

51. The combination of a work-support, two reciprocating thread-carriers, mechanism for supplying a length of thread to said carriers, and clamping members at one side of the work for engaging the thread and preventing lengthwise movement of the thread between the carriers.

52. The combination of a work-support, two reciprocating thread-carriers, mechanism for supplying a length of thread to said carriers, clamping members at one side of the work for engaging the thread and preventing lengthwise movement of the thread between the carriers, and mechanism for knotting the thread.

53. The combination of a work-support, clamping members at one side of the work for engaging and holding the thread from lengthwise movement, and means for drawing the ends of the thread away from the clamping members.

54. The combination of a work-support, means for supplying a length of thread, clamping members at one side of the work for engaging and holding the thread from lengthwise movement, and means for drawing the ends of the thread away from the clamping members.

55. The combination of a work-support, means for supplying a length of thread, clamping members at one side of the work for engaging and holding the thread from lengthwise movement, means for drawing the ends of the thread away from the clamping members, and knotting mechanism to which the threads are delivered.

56. The combination of holding devices between which the work is held, two needles, means for thrusting the needles through the work, means for then opening the eyes of the needles to receive a thread, mechanism for laying a thread in the open eyes of the needles, means for retracting the needles, means for closing the eyes of the needles during their return through the work, and a knotting mechanism to which the threads carried through the work by the needles are delivered.

57. The combination of holding devices between which the work is held, two reciprocating needles having eyes open at the side, means for closing said eyes during the passage of the needles through the work and then opening said eyes to receive a thread, mechanism for introducing a thread into said eyes through the open sides, and a knotting mechanism to which the threads carried through the work by the needles are delivered.

58. The combination of holding devices between which the work is held, means for supplying a length of thread on one side of the work, means for carrying the ends of the thread through the work, a knotting mechanism, and means for operating said mechanism to tie the knot close to the surface of the work before the work is released.

59. The combination of holding devices between which the work is held, mechanism for supplying a length of thread on one side of the work, thread-carrying devices for carrying the free ends of said length of thread to the other side of the work, and a knotting mechanism for tying the thread ends together.

60. The combination of a work-plate, a presser-foot coöperating therewith, two reciprocating needles, thread-supplying mechanism on one side of the work-plate, and a knotting mechanism on the opposite side of the work-plate.

61. In a machine of the kind described having a work-supporting table, means for clamping the work and a plurality of needles adapted to reciprocate between a position above the table and a position below it, means for feeding the thread to said needles and means for clamping said thread during the upward movement of the needles comprising a thread-holder located below the table and means for moving it to carry and clamp the thread against the under surface of the table as described.

62. In a machine of the kind described, in combination with a pair of vertically-reciprocating needles and means whereby said needles are threaded as set forth, a feed-table adapted to support the material to be tufted, a compression-ring adapted to compress said material against said table, said table being provided with an opening through which said needles may pass down to bring up a thread said opening being approximately under said compression-ring, one edge of said opening projecting between the paths of motion of said needles, and a thread-holder having a reciprocating movement adapted to clamp the thread on the under side of said projection of said feeding-table, whereby the loop of the thread may be held out of engagement with the material during the draft of the thread therethrough by the needles, as described.

In testimony whereof we have affixed our signatures in presence of two witnesses.

SILAS A. MILLER.
CHARLES B. GILMORE.

Witnesses:
JOSEPH L. STACKPOLE, Jr.,
IRA L. FISH.